June 22, 1926.

J. A. DE LISLE 1,589,843

SOLDERING IRON

Filed Oct. 16, 1924

INVENTOR
J. A. DE LISLE

By *[signature]*
ATTY.

Patented June 22, 1926.

1,589,843

UNITED STATES PATENT OFFICE.

JOSEPH A. DE LISLE, OF CHICAGO, ILLINOIS.

SOLDERING IRON.

Application filed October 16, 1924. Serial No. 744,029.

The present invention has to do with soldering irons and relates particularly to one adapted to be heated by an electric current.

Among the objects of the invention, are an improved design for a soldering iron tending to provide for inexpensive manufacture, a unique form or model therefor fully protective of the operator, an arrangement of parts and a design therefor conducive to high efficiency, and a general improvement in the arrangement of such parts whereby their assembly may be facilitated.

Figure 1:
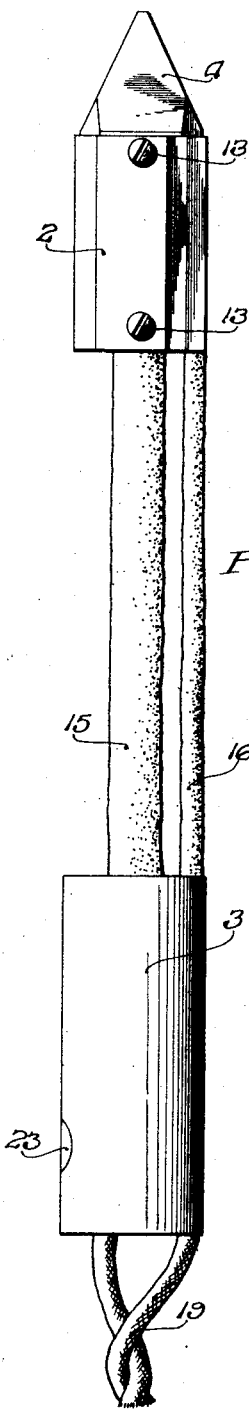
Figure 2:
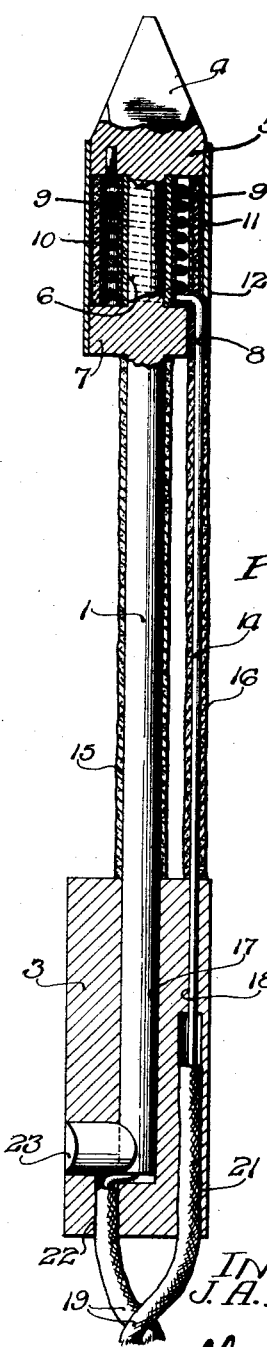

These and such other objects as may hereinafter appear, are obtained by novel construction, combination and arrangement of the several parts which form the device, all of which are amply illustrated in the accompanying single sheet of drawing hereby made a part of this specification, and in which Figure 1 is a view and elevation of one embodiment of the device; and Figure 2 is a longitudinal section through said embodiment.

In the drawing, in which Figure 1 is an elevation of my improved electric soldering iron, and Figure 2 is a longitudinal section therethrough, like reference characters are used to designate similar parts, said parts being referred to in the description which follows by said reference numerals.

The device comprises, mainly, a shank 1, a soldering head 2 at one end of said shank 1, and a handle 3 at the opposite end thereof. Said head 2 comprises a front section on soldering point 4, ordinarily of a cone of pyramidal configuration, and a main section or body 5 having a broad or wide circumferential groove 6 extending substantially its entire length. A circumferential heel 7 on said body 5 at its inner end is longitudinally grooved at 8 for a purpose hereinafter to be described.

About the body 5 within the groove 6 is wrapped an insulating sheet or member 9 around which is wound a coil of resistance wire 10, one end of which is in electrical connection with the material of head 2. The other terminal of said resistance coil 10 is adapted to pass out from the body 5 through the groove 8. A second insulating sheet or member 11 is wrapped about the coil 10 and the adjacent abutting portions of the head 2 including the heel 7. About said insulating wrapper 11 is a protective shield 12, generally of a single sheet of metal bent longitudinally around said head 2 in a manner whereby the ends of said shield 12 are made to overlap, said ends being united one to another by a plurality of screws or other fastening members 13, which fastening members pass through said overlapping ends and into the head 2 adjacent to the margins of said groove 6.

The shank 1 provides one of the conductors or mains for conducting current to resistance coil 10, said shank being seated in and secured to the handle 3 which is of a dielectric. Another lead or main 14 from said coil 10, as previously indicated passes out at groove 8, and from there extends to the handle 3 running substantially parallel to the shank 1. The main 14 is also seated in and secured to handle 3. Both shank 1 and lead 14 are preferably covered with an asbestos tubing for purposes of insulation, said tubes being designated 15 and 16 in the drawing.

Within the handle 3, which is bored through as indicated at 17 and 18, an electrical connection is established between said shank 1 and lead 14 and flexible cords 19 and 20 which are directly connected to a source of electromotive force, not shown. Said cords lead into said handle 3 through apertures 21 and 22. Said shank is anchored in said handle by pin 23 to prevent displacement from said handle 3.

The device as illustrated and described provides a most efficient and safe tool. The head 2 which ordinarily is of copper, heats up very rapidly and can be maintained at a constant temperature which, of course, is impossible with a soldering iron heated by external means, such as a charcoal stove, gasoline torch, or the like.

The employment of a dielectric for handle 3 combined with asbestos tubing about the shank 1 and lead 14 renders the device wholly shockproof as used by a mechanic for the purposes designed.

I claim:—

An electric soldering iron comprising a head having an integral shank, said head being circumferentially grooved and having a longitudinally groove extending from the circumferential groove portion to its innermost end, a coil of resistance wire disposed in said circumferential groove portion and having one end extending to a handle through said longitudinal groove and insulated from said head, a shield about said groove, an insulating sheet intermediate said shield and said coil of resistance wire, the other end of said resistance coil being electrically connected to said shank, said shank having a covering of a heat-resisting dielectric, a handle of insulating material provided with longitudinal slots upon said shank, and wires to a source of electromotive force in said slots.

JOSEPH A. DE LISLE.